March 23, 1954 — C. E. LOMAX — 2,673,243

TELEPHONE COIN COLLECTION SYSTEM

Filed July 29, 1950 — 5 Sheets-Sheet 1

INVENTOR.
CLARENCE E. LOMAX
BY
Chas. W. Candy
ATTORNEY

March 23, 1954

C. E. LOMAX 2,673,243

TELEPHONE COIN COLLECTION SYSTEM

Filed July 29, 1950

5 Sheets-Sheet 2

INVENTOR.
CLARENCE E. LOMAX

BY

ATTORNEY

March 23, 1954 C. E. LOMAX 2,673,243

TELEPHONE COIN COLLECTION SYSTEM

Filed July 29, 1950

5 Sheets-Sheet 3

INVENTOR.
CLARENCE E. LOMAX

BY [signature]

ATTORNEY

INVENTOR.
CLARENCE E. LOMAX
BY
[signature]
ATTORNEY

March 23, 1954 C. E. LOMAX 2,673,243

TELEPHONE COIN COLLECTION SYSTEM

Filed July 29, 1950

5 Sheets-Sheet 5

INVENTOR.
CLARENCE E. LOMAX

BY [signature]

ATTORNEY

Patented Mar. 23, 1954

2,673,243

UNITED STATES PATENT OFFICE 2,673,243

TELEPHONE COIN COLLECTION SYSTEM

Clarence E. Lomax, Chicago, Ill., assignor to Automatic Electric Laboratories, Inc., Chicago, Ill., a corporation of Delaware Application July 29, 1950, Serial No. 176,756

6 Claims. (Cl. 179—6.3)

This invention relates in general to automatic telephone systems and, more particularly, to means for controlling the coin mechanism wherein it is required that coins of a certain denomination only can initiate a call.

The main object of the present invention is the provision of a new and novel paystation circuit arrangement wherein a party operating the dial subsequent to the depositing of a non-initiating denomination coin will cause that particular coin to be refunded.

It is another object of the invention to provide, in such an automatic telephone system, improved and simplified apparatus wherein refund potential is automatically transmitted responsive to the answering of the operator only when the call originates from a paystation.

It is another object of the invention to provide improved and exceedingly simple paystation circuit apparatus wherein a more positive indication of the success or failure of manual operation of the coin magnets is afforded the operator.

These and other objects are accomplished according to the invention, by the arrangement and combination of elements set forth in the following description, defined in the appended claims and illustratively exemplified in the accompanying drawings, in which:

Figs. 1–5 are assembled from left to right in order.

In the preferred form of this invention the arrangement is such that a dime or a quarter must be deposited before a call may be initiated. The coin collect-refund mechanism shown in Fig. 1 may be of the well known type as illustrated in U. S. patent to George A. Long, No. 1,886,409, granted November 8, 1932, with a slight modification of the hopper. The hopper is enlarged and so constructed that two distinct and separate channels are provided to pass the coins to the arresting device. The coin races leading to the hopper are also modified so that dimes and quarters will be guided to one channel of the hopper while nickels only will be directed to the other. The coin trigger that controls the operation of the coin springs protrudes into one of these channels—the one passing dimes and quarters. Therefore, only dimes or quarters can trip the coin springs and initiate a call. It should be understood that any mechanical arrangement that produces this same result could be used in combination with this circuit arrangement. The inventor does not wish to be limited merely thereto.

Figure 1:
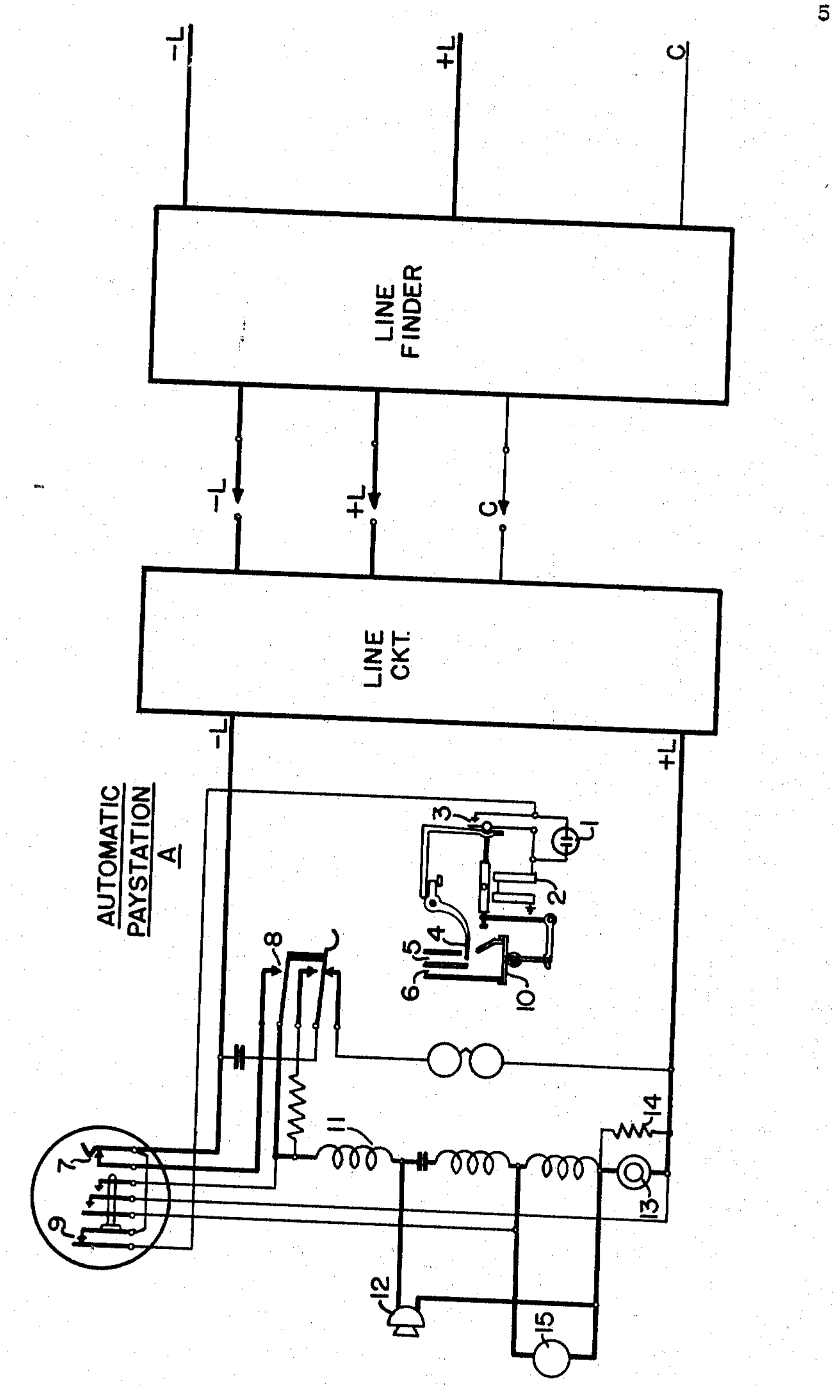
Fig. 1 shows an automatic substation of the paystation type, an associated line circuit and a succeeding line finder.
Figure 2:
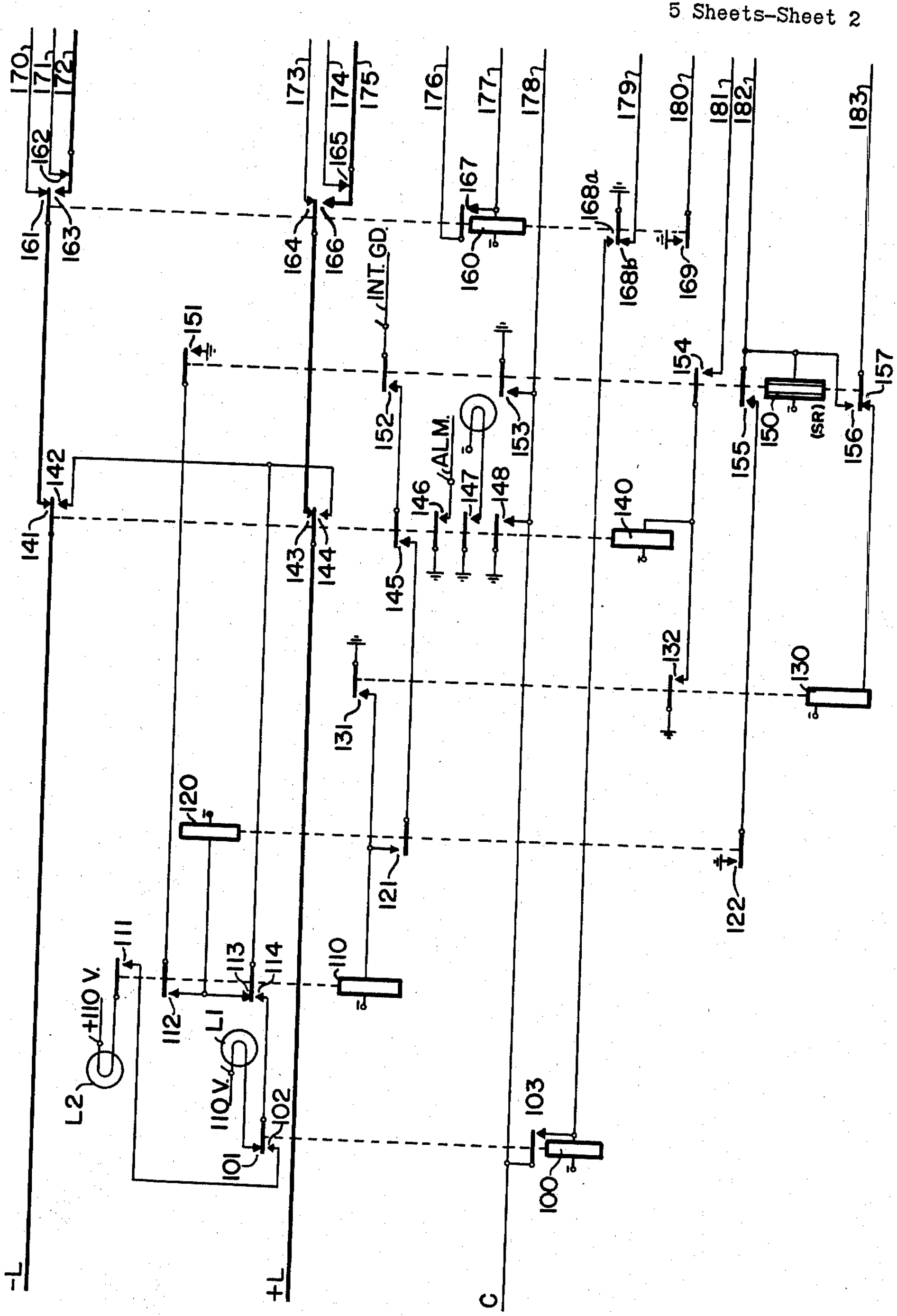
Fig. 2 shows a portion of the paystation repeater associated with the line finder.
Figure 3:
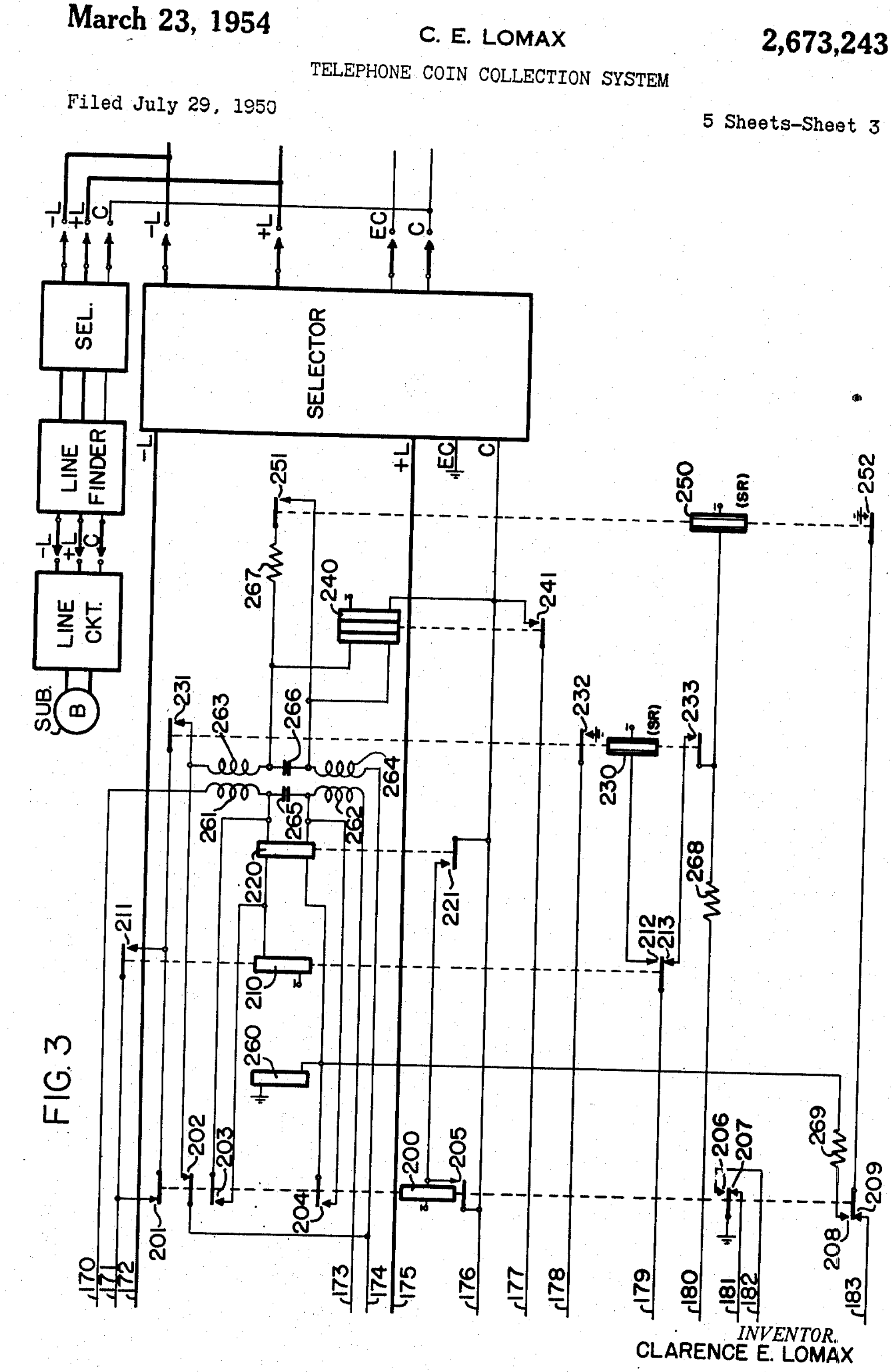
Fig. 3 shows the remainder of the paystation repeater circuit associated with its succeeding selector. A regular subscriber and a switch train is illustrated in the upper right section.
Figure 4:
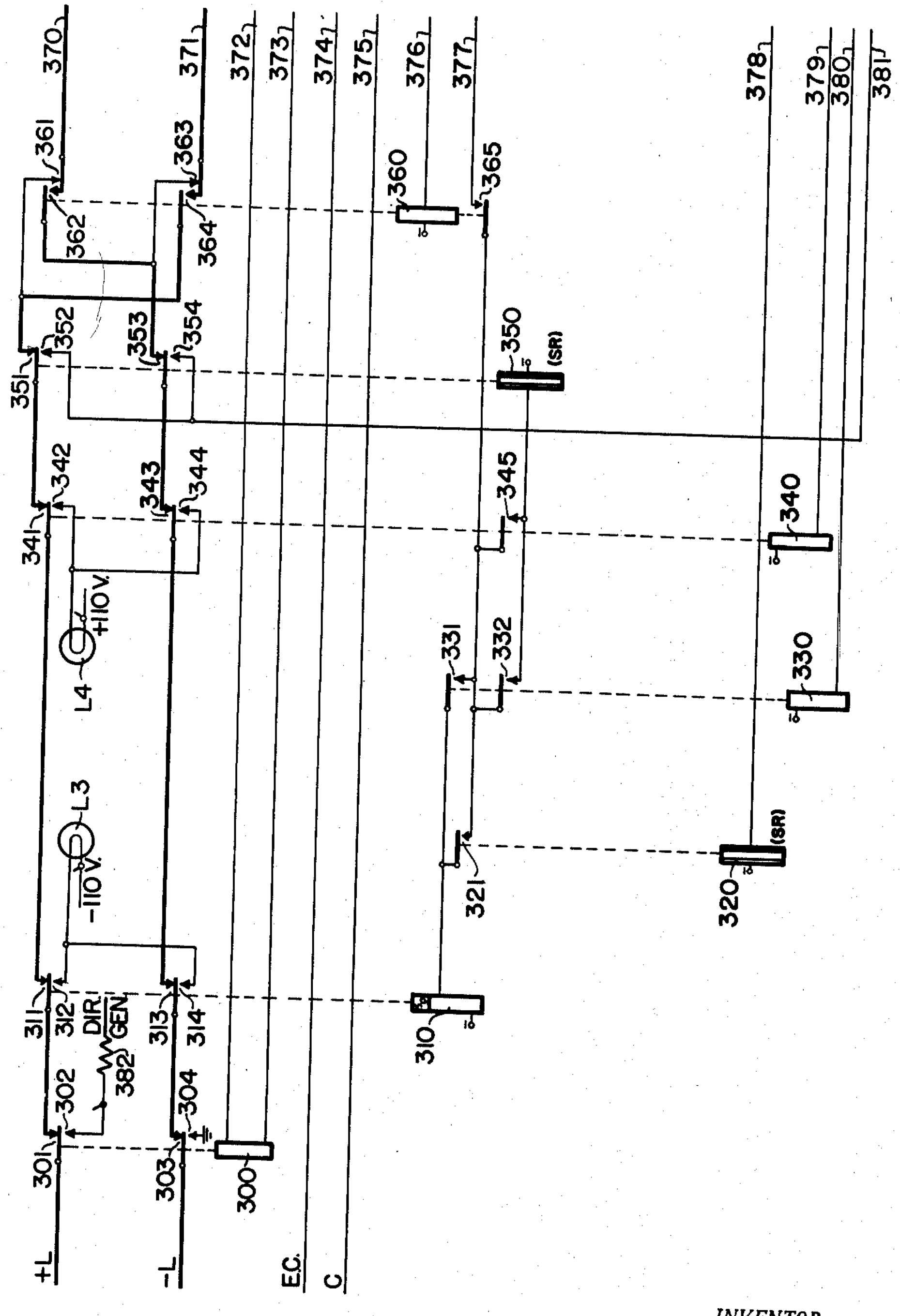
Fig. 4 shows a portion of the combined line and recording trunk circuit (hereinafter referred to as CLR trunk).

The line finders indicated in Fig. 1 and Fig. 3 may be of the well known Strowger type as shown in U. S. patent to Saunders No. 1,849,694, granted March 15, 1932. The line circuits indicated may also be of the type as shown in the above-mentioned patent. The neon tube shown in Fig. 1 has the well-known characteristic of being non-conductive until a predetermined voltage is impressed across the terminals thereof. Following ionization of the gas contained therein the voltage required to maintain the tube conductive is substantially less than that required for initiating ionization. Also, the resistance of the device is substantially lessened after the device is rendered conductive. This neon tube is so arranged in the circuit that it will form a path for refunding voltage and still bar the line from ground through the coin magnets when the coin springs are not tripped.

It should be understood that any suitable discharge device could be used in lieu of a neon tube. The inventor does not wish to be limited merely thereto.

The selectors indicated in Fig. 3 may be of the well known Strowger type similar to the selector shown in U. S. Patent No. 1,956,374, granted April 24, 1934.

In order to explain the operation of the circuits, it will first be assumed that a party wishes to extend a call from the automatic paystation A to a subscriber in a distant exchange, not shown, and the party attempts to do so by depositing a nickel in the coin collecting mechanism at the paystation. The nickel would descend through the modified coin race emerging and entering the hopper at the top of channel 6. The coin would then proceed unobstructed to arresting device 10, whereupon it is retained. It will be seen from the diagram of the coin hopper mechanism in Fig. 1 that coins traversing channel 6 will completely circumvent coin trigger 4. Thus, the depositing of a nickel will cause no action whatsoever. The result is the same as if no coin had been deposited.

It will now be assumed that following the depositing of said nickel the receiver is removed. A loop circuit is formed through paystation A, traced over the following path: line —L, dial pulsing contact 7, hook-switch contact 8, induction coil winding 11, talking transmitter 12, coin tone transmitter 13 and resistor 14 in parallel, to line +L. The line relay in the indicated line circuit will energize over this loop circuit in well known manner and a line finder will subsequently initiate a search for calling paystation line A, also in well known manner. The line finder being of the pre-seizing type, will close a loop within itself to the associated succeeding repeater before the calling line is actually found. Once it is found the loop, of course, extends back to the paystation. Line relay 210 will then energize, traced over the following path: ground, impedance resistor 260, lower winding of differential relay 220, repeating coil winding 262, conductor 173, contact 164, contact 143, line +L, loop circuit hereinbefore explained, line —L, contact 141, contact 161, conductor 170, repeating coil winding 261, upper winding of differential relay 220, through line relay 210 to battery. As is well known in the art, differential relay 220 will not operate when its two windings are energized simultaneously. Line relay 210, in closing contact 212, completes a path to operate release relay 230, traced over the following path; ground, contact 168b, conductor 179, contact 212, through release relay 230 to battery. Pulse repeating contact 211 is also closed upon operation of line relay 210, but serves no useful function at this point. Release relay 230 in closing contact 231 closes the loop to pre-seize the associated succeeding selector, traced over the following path: line —L, conductor 172, contact 162, conductor 171, contact 211, contact 231, contact 202, conductor 174, contact 165, conductor 175, to line +L. Release relay 230, in closing contact 232 applies ground to the control lead C to hold the preceding switches. Release relay 230, in closing contact 233, partially completes an energizing path for hold relay 250, circuit to be traced hereinafter. It will be stated at this point that the shunt field relay 240 will not operate as the voltage impressed on each half of the relay is of such polarity that the resultant flux produced by the two currents will aid and confine their magnetic paths within the core of the shunt field relay, producing no movement of the shunt field armature. Dial tone is not heard by the party at substation A as the repeating coil that transforms the tone from the selector, circuit to be traced hereinafter, will be disabled. This disablement of the repeating coil is effected by a short around windings 263 and 264 over contact 202.

The party at substation A now dials a digit in an attempt to communicate with a party at a distant station. Line relay 210 being in series with the dial pulsing contact 7, responds to the pulses. Once again the pulse repeating contact 211 will serve no useful function as a shunt over contact 201 will maintain the pulse repeating circuit in a constant state, preventing the repeating of the dialed pulses to pass on and operate the selector. This pulse repeating circuit will subsequently be described.

Thus, it can be seen that paystation A is incapable of extending a call in the present condition, namely, subsequent to the depositing of a nickel. Responsive to the first pulse of the particular digit dialed, line relay 210 in falling back and closing contact 213 operates hold relay 250, traced over the following path: ground, contact 168b, conductor 179, contact 213, contact 233, through hold relay 250 to battery. Release relay 230, being of the slow-to-release type will retain contact 233 closed during the time its energizing circuit is momentarily opened at contact 212 due to pulsing. Hold relay 250, by closing contact 251 places resistor 267 across condenser 266, reason therefor hereinafter explained. Hold relay 250 also, by closing contact 252, causes relay 130 to operate, traced over the following path: ground, contact 252, contact 209, conductor 183, contact 157, through relay 130 to battery. Relay 130, once operated, places ground on contacts 131 and 132 to energize relays 110 and 140, respectively. Relay 140, in closing contacts 142 and 144 prepares a path for the refunding potential. Other functions of relay 140 will subsequently be described. Relay 110, by closing contact 114 completes the path and applies refunding potential back to the substation line, traced over the following path: negative 110 volt refunding potential, lamp L1, contacts 191, 114, 142, conductor —L, line finder wiper —L, line finder bank contact —L to substation line —L. At this point, namely, during pulsing, the remaining circuit from line —L, over dial off-normal contact 9, neon tube 1, through coin magnets 2 to ground will be open at dial off-normal contact 9. Refund voltage, however, will be applied after as well as during the pulsing period as will be subsequently described.

Relay 140 also opens the circuit to line relay 210, hereinbefore traced, at contacts 141 and 143. Line relay 210 will therefore receive no more pulses, but restoring will permit hold relay 250 to remain energized, circuit for which has been traced hereinbefore. Release relay 230, being of the slow-to-release type, will maintain the energizing circuit for hold relay 250 at contact 233 and hold relay 250, also being of the slow-to-release type, will prolong its operation still further after release relay 230 no longer can close contact 233. The result is that ground on contact 252 is maintained until after pulsing is completed in order to hold relays 130, 110 and 140 in their operated positions, respective energizing circuits having been hereinbefore described. Refund potential is then applied to line —L during and after the dialing of a digit. When the dial comes back to normal the refunding potential will be impressed across the neon tube and coin magnets in series as hereinbefore described. The negative 110 volts is sufficient to cause this neon discharge device to become ionized and conductive. Thus the coin magnets 2 will operate and cause arresting device 10 to pass the nickel to the coin return receptacle. Relay 140, in closing contact 148, grounds the control lead C. This ground is provided so that removal of ground at contact 232, responsive to the complete deenergization of relay 230, will not release the preceding line finder. The finder will thus be held as long as refund battery is applied to conductor —L.

As the depositing of a nickel affected nothing whatsoever, it can easily be understood that the identical result as heretofore described would likewise occur if a party at paystation A lifted the receiver and attempted to dial without depositing a coin. Similarly, the same operation would have taken place had the party at paystation A hung up without dialing. Opening of the hook-switch contact 8, responsive to replacing the receiver, will open the loop circuit, as hereinbefore traced. Since the first momentary interruption of the loop circuit, effected by the operation of dialing, ultimately results in application of refunding potential to the coin magnets 2, as hereinbefore described, the permanent opening of hookswitch contact 8 will similarly do so.

It will now be assumed that upon failure to initiate a call with a nickel the party at paystation A deposits a dime or a quarter. The dime or quarter descends the appropriate coin race emerging at the opening of channel 5. From the coin mechanism diagram in Fig. 1 it can be seen that coin trigger 4 will be tripped as the dime or quarter descends channel 5. The coin will be retained on arresting device 10 in well known manner and the tripping of coin trigger 4 will actuate coin springs 3, also in well known manner. By closing coin springs 3 line −L is effectively grounded through coin magnets 2. The function of this ground will be hereinafter explained. Removal of the receiver at paystation A, either before or after the depositing of the dime or quarter, will cause line relay 210 to operate, once the line is found, over the loop in the same manner as previously described for the nickel depositing. However, at this time the ground on line −L at the paystation will unbalance differential relay 220 and cause operation of same. The upper winding of differential relay 220 will be energized over the following path: ground at the paystation, through coin magnets 2, coin springs 3, dial contact 9, paystation line −L, line finder bank contact −L, line finder wiper −L, conductor −L, contact 141, contact 161, conductor 170, repeating coil winding 261, through upper winding of differential relay 220 and line relay 210 to battery. There is also another energizing path for the upper winding of differential relay 220, traced over the following path: ground, impedance resistor 260, lower winding of differential relay 220, repeating coil winding 262, conductor 173, contact 164, contact 143, conductor +L, line finder wiper +L, line finder bank contact +L, paystation line +L, coin tone transmitter 13 and resistor 14 in parallel, talking transmitter 12, induction coil winding 11, hookswitch contact 8, dial pulsing contact 7, paystation line −L, line finder bank contact −L, line finder wiper −L, conductor −L, contact 141, contact 161, conductor 170, repeating coil winding 261, through top winding of differential relay 220 and line relay 210 to battery. The current now flowing through the upper winding of differential relay 220 is essentially of the same magnitude as that flowing in the case of an ungrounded line −L, namely, coin springs not closed. However, unlike that case the lower winding will have ground on each side rendering it incapable of producing a flux to balance out that produced by the top winding. Ground to the left side of the lower winding of differential relay 220 will be traced over the following path: ground, through impedance resistor 260 to the lower winding of the differential relay 220. Ground to the right side of the lower winding of differential relay 220 will be traced over the following path: ground at the paystation A, through coin magnets 2, coin springs 3, dial contact 9, dial pulsing contact 7, hookswitch contact 8, induction coil winding 11, talking transmitter 12, coin tone transmitter 13 and resistor 14 in parallel, paystation line +L, line finder bank contact +L, line finder wiper +L, conductor +L, contact 143, contact 164, conductor 173, repeating coil winding 262 to lower winding of differential relay 220. Since only the upper winding of differential relay 220 is energized operation of same will follow. Differential relay 220, in closing contact 221, prepares the energizing circuit for relay 200, traced hereinafter.

Line relay 210, in closing contact 212, operates release relay 230, circuit for which has been traced hereinbefore. Release relay 230, in closing contact 231 preseizes the associated selector, circuit for which also has been traced hereinbefore. Once seized, the selector will return ground back over the control C lead. This ground will cause relay 200 to operate over the following path: ground from selector, control C lead, contact 221, through relay 200 to battery. This ground returned from the associated succeeding selector on the control C lead will also energize the right winding of shunt field relay 240. Battery and ground on conductors −L and +L, respectively, will also be returned from the line relay of the selector to energize the left winding of shunt field relay 240, traced over the following path: negative battery, through top winding of selector line relay (not shown), conductor −L, conductor 172, contact 162, conductor 171, contact 211, contact 231, repeating coil winding 263, through left winding of shunt field relay 240, repeating coil winding 264, conductor 174, contact 165, conductor 175, conductor +L, through bottom winding of selector line relay (not shown) to ground. At this point the voltages impressed on each side of shunt field relay 240 will be of such polarity that the armature will not be actuated, reason therefor explained hereinbefore. Relay 200, in opening contact 201 and thereby removing the shunt around contacts 211, renders the pulse repeating circuit capable of functioning as such, traced over the following path: ground, lower winding of selector line relay, conductor +L, conductor 175, contact 165, conductor 174, repeating coil winding 264, left winding of differential relay 240, repeating coil winding 263, contact 231, pulse repeating contact 211, conductor 171, contact 162, conductor 172, conductor −L, upper winding of selector line relay to battery. Relay 200 also, by opening contact 202, permits dial tone to be heard by the party at paystation A. Dial tone A. C. voltage will be inductively coupled to the conductor between ground and the lower winding of the selector line relay. This dial tone will be impressed across the right two windings 263 and 264 of the repeating coil, traced over the following path: through lower winding of selector line relay, conductor +L, conductor 175, contact 165, conductor 174, repeating coil winding 264, condenser 266 and left winding of shunt field relay 240 in parallel, repeating coil winding 263, contact 231, contact 211, conductor 171, contact 162, conductor 172, conductor −L, through upper winding of selector line relay, through battery to ground. The dial tone A. C. voltage, by transformer action, will be impressed across the left two windings 261 and 262 of the repeating coil and transmitted back to paystation A in well known manner. Relay 200 also, in closing contacts 203 and 204 shunt the upper and lower windings, respectively, of differential relay 220. Shunting differential relay 220 eliminates same from the dial pulsing path, circuit for which has been traced hereinbefore, thereby increasing the pulsing current. Shunting differential relay 220 also provides more transmitter 12 current when free service stations are dialed.

This is necessary since the completion of such calls will not cause reverse battery to be returned, which is essential for the operation of the switch through relay 160, as will be explained hereinafter. The paystation A will therefore not extend, clear of attachments, through the repeater. For free service calls the talking circuit will be identical to the dial pulsing path, traced over the following path: ground, impedance resistor 269, contact 204, repeating coil winding 262, conductor 173, contact 164, contact 143, conductor +L, calling loop, conductor −L, contact 141, contact 161, conductor 170, repeating coil winding 261, contact 203, through line relay 210 to battery. It can easily be seen that talking battery is supplied from the line relay 210 of the repeater for free calls rather than from the connector line relay as in the case of regular calls. It can likewise be seen that the elimination of the differential relay and its resistance will increase the transmitter current. Relay 200 also, by closing contact 205 locks itself operated from the ground that is returned from the selector over the control C lead. This self-locking feature is necessary since contacts 203 and 204 in closing will cause differential relay 220 to restore and open the original energizing circuit for relay 200 at contact 221. Relay 200 also, in closing contact 208 prepares a path for resistor 269 to shunt impedance resistor 260, circuit for which will be traced hereinafter. Relay 200 also, in closing contact 206, causes relay 150 to operate, traced over the following path: ground, contact 206, conductor 182, through relay 150 to battery. Functions of relay 150 will be discussed hereinafter.

It is now assumed that subsequent to the return of dial tone the party at paystation A will dial the digit combination peculiar to the desired distant station. It will further be assumed at this point that the called station will be busy. Line relay 210 responds to the dial pulses, circuit for which has been traced hereinbefore, and by operating contact 211 which is in the pulse repeating circuit, also traced hereinbefore, the pulses will be repeated to the succeeding selector. The first pulse in causing line relay 210 to restore and close contact 213 will effect the operation of slow-to-release hold relay 250, circuit for which has been traced hereinbefore. Relay 250, in closing contact 252, causes resistor 269 to shunt impedance resistor 260, traced over the following path: ground, contact 252, contact 208, resistor 269 to impedance resistor 260. Shunting of impedance resistor 260 will improve dialing and as release relay 230 and hold relay 250 are both of the slow-to-release type, this improvement will be operative during the entire dialing operation. Relay 250 also, in closing contact 251 places resistor 267 in parallel with condenser 266. This resistor 267 will also be maintained in the pulsing circuit during the dialing operation and will likewise improve pulsing. The pulse will be repeated to the succeeding switch train and cause the selection of the proper station in well known manner.

Having assumed the called station to be busy, busy tone will be transmitted back to paystation A subsequent to the operation of the connector associated with the called station. The busy tone A. C. voltage will originate at the connector and extend back over the lines, via the preceding switches, to repeating coil windings 263 and 264. Repeating coil windings 261 and 262 inductively receive the busy tone voltage and in similar fashion as dial tone transmission the busy tone will appear across the paystation A. The party at paystation A will then replace the receiver and cause the opening of hookswitch contact 8 and consequently the opening of the energizing circuit, traced hereinbefore, to the line relay 210. Line relay 210, in opening contact 211, opens the pulse repeating circuit, traced hereinbefore, causing the succeeding switch to release. Line relay 210, in opening contact 212, causes release relay 230 to restore. Release relay 230, being of the slow-to-release type, may restore either before or after the succeeding switches release. Relay 150 in still being energized at this time, maintains ground at contact 153 to contact C to hold the preceding line finder. The succeeding switch train in releasing and no longer sending ground back on control C causes relay 200 to restore, holding circuit for which has been traced hereinbefore. Relay 200, in restoring and thereby closing contact 207 operates relay 140, traced over the following path: ground, contact 207, conductor 181, contact 154, through relay 140 to battery. Relay 140, in closing contacts 142, connects one side of relay 120 to line −L. Since the line −L is grounded through coin magnets 2, effected by the depositing of a dime or quarter as hereinbefore explained, relay 120 will operate, traced over the following path: ground at paystation A, coin magnets 2, coin springs 3, dial contact 9, line −L, line finder bank contact −L, line finder wiper −L, conductor −L, contact 142, contact 113, through relay 120 to battery. Relay 200, upon restoring opens the energizing circuit to relay 150, circuit for which has been traced hereinbefore. However, relay 120 in closing contact 122 renders slow-to-release relay 150 a different energizing circuit before same relay 150 can fully restore, traced over the following path: ground, contact 122, contact 155, through relay 150 to battery. Relay 150 in maintaining contact 152 closed, relay 140 in closing contact 145, and relay 120 in closing contact 121 cooperate to supply interrupted ground to operate relay 110, traced over the following path: interrupted ground, contact 152, contact 145, contact 121, through relay 110 to battery. Relay 110, being of the fast acting and release type will operate periodically in response to the pulses of ground received by it from interrupted ground. Thus, relay 110, in closing contact 114 will apply refund potential intermittently to coin magnets 2, circuit for which has been traced hereinbefore. Relay 110, in closing contact 112 before 114 (said relay springs adjusted to operate in that order), will provide a different energizing circuit for relay 120 during the period refund potential is applied to line −L, traced over the following path: ground, contact 151, contact 112, through relay 120 to battery. The original energizing circuit of relay 120 is opened at contact 113 in order that the coin magnet 2 will receive all of the current produced by the coin potentials. Relay 110 restores at the end of each pulse and again connects relay 120 to line −L, circuit for which has been traced hereinbefore. If a pulse of refund potential properly operated coin magnets 2 and refunds the coin, in well known manner, coin springs 3 will open. With the neon tube between ground and line −L, relay 120 will restore. Relay 120, in restoring and opening contact 121, will open the energizing circuit for relay 110. Relay 110, in opening contact 114, will cause the removal of refund potential from line −L, circuit for which has been traced hereinbefore. Relay 120 also, in opening contact 122, will cause relay 150 to restore, circuit for which has been traced hereinbefore. Relay 150, in restoring and opening contact 154, causes the restoration of relay 140, circuit for which has been traced hereinbefore. Relay 150 also, in opening contact 153 removes ground from the C lead and causes the release of the finder. However, if the coin is not properly disposed of coin springs 3 will remain closed and maintain relay 120 operated. Relay 110 will then operate repeatedly from interrupted ground with the resulting refund voltage pulses transmitted back to coin magnet 2. This operation will continue until the coins are dislodged and refunded. Once disposed of the circuit will operate as hereinbefore explained.

It is now assumed that the party at paystation A wishes to call another distant subscriber and once again deposits a dime or quarter. It will further be assumed that the called line will not be busy. As previously explained the party can dial effectively subsequent to depositing of a dime or quarter. Upon answering of the called party, the back bridge relay in the connector (not shown) associated with the distant called station, will operate and reverse the battery to the repeater in well known manner. Thus, the polarity of the voltage applied to the left hand winding of the shunt field relay 240 will be reversed from that hereinbefore explained. The flux now produced by the current in the left-hand winding will oppose the flux produced by the current in the right-hand winding and the armature will be attracted to complete the two magnetic paths. Shunt field relay 240 thus operated will close contact 241 and cause the operation of the switch through relay 160, traced over the following path: ground from succeeding last switch, contact 241, conductor 177, through relay 160 to battery. Switch through relay 160, in closing contact 167, locks itself operated from ground over the C lead. Switch through relay 160 in closing contacts 163 and 166 switch lines −L and +L direct through to the switch train. Switch through relay also, in closing contact 168a causes relay 100 to become energized. Functions of relay 100 will be hereinafter explained. Switch through relay 160 also, in opening contacts 161 and 164 open the energizing circuit to line relay 210, circuit for which has been traced hereinbefore. Line relay 210 in opening 212 and closing 213 restores and operates relays 230 and 250, respectively, as hereinbefore explained. At the conclusion of the conversation and subsequent to the replacing of the receiver by the called party, the succeeding switches will be released. Ground no longer coming back over the C-lead will cause switch through relay 160 and relay 200 to restore, circuits for which have been traced hereinbefore. The coin will now be disposed of by the same sequence of operations as previously explained, with the exception that relay 100, being operated, will close contact 102 and apply +110 v. collect potential instead of −110 v. refund.

It will now be assumed that the party at paystation A wishes to make a toll call and, subsequent to the depositing of a dime or quarter, dials the operator to do so. The selector shown is of the four wiper type and will be peculiar to paystations only. The fourth wiper, EC, will be grounded at the selector. The dial pulses will be effective, as previously explained, and the wipers of the selector will vertically step to the toll operator's level and then automatically step rotary to a set of contacts associated with an idle CLR trunk. This sequence of operations is well known in the art. Assuming now that an idle position is found, a closed line loop will be extended to energize relay 440, traced over the following path: ground, through lower winding of relay 440, repeating coil winding 485, conductor 371, contacts 363, 353, 343, 313, 303, conductor +L, selector bank contact +L, selector wiper +L, over repeater pulsing loop as previously described selector wiper −L, selector bank contact −L, conductor −L, contacts 301, 311, 341, 351, 361, conductor 370, repeating coil winding 483, through upper winding of relay 440 to ground. Relay 440, in closing contact 441, causes relay 430 to operate, traced over the following path: ground, contact 441, through relay 430 to battery. Relay 430, in closing contact 431, causes relay 420 to operate, traced over the following path: ground, contact 431, contact 411, through relay 420 to battery. Other functions of relay 430 will be hereinafter explained. Relay 420 in closing contact 423 applies ground to the C lead over conductor 375 to hold the preceding switches. As this is a paystation calling the toll operator, relay 450 will operate, traced over the following path: ground at EC at selector, selector wiper EC, selector bank contact EC, conductor 374, through relay 450 to battery. Functions of relay 450 will be hereinafter explained. Relay 430, in closing contact 435 and relay 450, in closing contact 454, together cause relay 320 to operate, traced over the following path: ground, contact 435, contact 408, contact 454, conductor 378, through relay 320 to battery. Relay 430 also, in closing contact 434, and relay 450, in closing contact 452, together cause the call signal lamp L5 at the jack associated with the CLR trunk to illuminate intermittently, traced over the following path: interrupted ground, contact 452, contact 434, contact 406, through call signal lamp L5 to battery. Relay 420 also, in closing contact 421 applies ring back tone back over the line to the calling paystation. The flashing call signal lamp will indicate to the operator that a paystation is desirous of completing a toll call. The operator now answers by inserting the plug associated with a cord. The ring, tip, and sleeve of the plug are connected to the ring, tip, and sleeve of the jack, respectively, and the hold consleeve of the jack, respectively, and the hold conductor at the jack is grounded. Relay 410 will then operate over the following path: ground, contact 482, hold conductor H, through relay 410 to battery. Relay 410, in closing contact 412, causes relay 400 to operate. Relay 410, in opening contact 411, causes relay 420 to release after a delay (relay 420 is of the slow-to-release type). Relay 420 will restore and remove ground on the C lead at 423 but after relay 400 operates and applies another ground to C at control 403. Thus, the preceding switches will be held. Relay 400, in opening contact 401, removes ring back tone from the calling paystation. Relay 400, in making contact 404, causes relay 360 to operate, traced over the following path: ground, contact 404, conductor 376, through relay 360 to battery. Relay 400 also, in closing contact 403 and opening contact 406 and relay 430 in closing contact 433, together cause the interrupted ground to now flash intermittently the cord disconnect lamp L7 instead of the call signal lamp L5, traced over the following path: interrupted ground, contacts 452, 434, 405, 424, 433, conductor S, cord plug sleeve S through cord disconnect lamp L7 to battery. This flashing will only last a short time as slow-to-operate release relay 420 will open the cord disconnect circuit at contact 424. However, this short period of a flashing disconnect lamp L7 will be another reminder to the operator that she is answering a paystation. Relay 360, in closing contacts 362 and 364, and in opening contacts 361 and 363, causes a reversal of battery from relay 440 to operate shunt field relay 240 in the repeater. As hereinbefore explained, operation of shunt field relay 240 will cause the lines to be switched through the repeater circuit to the CLR trunk. Relay 400, in opening contact 408, causes the restoration of relay 320, circuit for which has been traced hereinbefore. Relay 360, in closing contact 365, relay 320, in maintaining contact 321 closed for a short time (relay 320 being of the slow-to-release type), and relay 450, in closing contact 451, together cause relay 310 to operate, over the following path: ground, contacts 451, conductor 377, contact 365, contact 321, through relay 310 to battery. Relay 310, in closing contact 312, will cause —110 v. refund potential to go out back over line —L to operate coin magnet 2 and refund the dime or quarter. The repeater must be switched through before refund potential is applied to line —L. This correct sequence of operations is effected by fast acting relay 360 operating before slow-to-operate relay 310. Slow-to-release relay 320 finally restores opening the circuit to relay 310 at contact 321. Thus, it will be seen that the initial coin is refunded to the party at paystation A as soon as the operator answers and before any conversation takes place. It will also be seen that relay 420 will finally restore and open the circuit to the cord disconnect lamp at approximately the same time that relay 320 restores and removes refund potential from line —L. This makes it possible for the operator to use the ceasing of the flashing of the disconnect lamp as the means for knowing when to speak to the party at paystation A. If the operator should become doubtful of the type of line after she has started conversing she can ascertain it by temporarily removing the plug. Removing the plug will open the circuit to relay 410 at contact 482. Relay 410 will thus restore, but relay 400 will remain operated over a new path: ground, contact 435, contact 407, through relay 400 to battery. Relay 410 in restoring and closing contact 411 will cause slow-to-release relay 420 to operate, circuit for which has been traced hereinbefore. Now, if the operator re-inserts the plug relay 410 will once again operate as hereinbefore explained, and open the circuit to relay 420, but the circuit to flash to the cord disconnect lamp, also hereinbefore explained, will be complete until relay 420 finally restores and opens contact 424. Thus, the operator will see a flashing disconnect lamp once again for a short time if the party is at a paystation.

Figure 5:
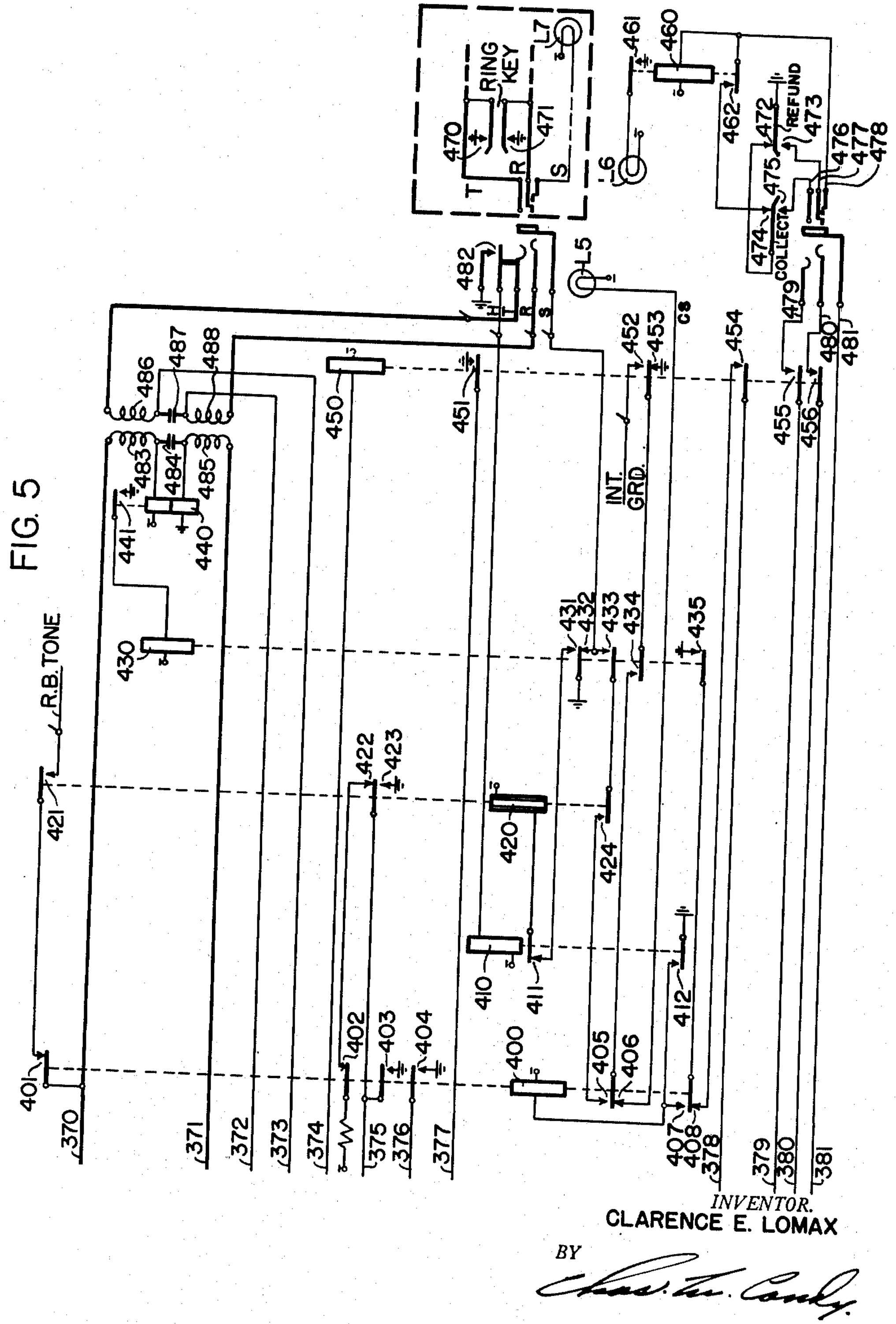
Fig. 5 shows the remainder of the CLR trunk and the operator's cord and coin control circuits.

The operator can now handle the call from paystation A in the usual manner. The operator can also collect or refund coins manually at any time. There is a separate cord as shown in the lower right hand portion of Fig. 5, associated with each operator's position. This collect-refund cord circuit has only standard switchboard talking voltage pass through rather than the higher coin collect-refund voltages. By inserting this collect-refund plug into the jack associated with the CLR trunk concerned, the operator can dispose of coins by operating either the refund key or the collect key. Assuming that the operator wishes to collect manually and pushes the collect key to so do, relay 340 will operate, traced over the following path: ground at collect-refund cord, contact 472, contact 475, plug tip 476, conductor 479, contact 455, conductor 379, through relay 340 to battery. Relay 340, in closing contact 342 applies +110 v. collect potential back out over the line —L to operate coin magnets 2 and collect the coins. Assuming now that the operator may wish to refund manually and pushes the refund key to so do, relay 330 will operate, traced over the following path: ground, contact 473, plug ring 477, conductor 480, contact 456, conductor 380, through relay 330 to battery. Relay 330, in closing contact 331 will cause relay 310 to operate, traced over the following path: ground, contact 451, conductor 377, contact 365, contact 331, through relay 310 to battery. Relay 310, in closing contact 312 applies refund potential back out over the line —L to refund the coins. Relay 340, in closing contact 345 when collecting, or relay 330, in closing contact 332 when refunding will cause slow-to-release relay 350 to operate, traced over the following path: ground, contact 451, conductor 377, contact 365, contact 345 or 332, through relay 350 to battery. Thus, it will be seen that relay 350 operates only when coin disposal is handled by the operator and also that either a manual refund or collection will operate said relay 350. Relay 350, in closing contacts 352 and 354, prepares the path to relay 460. Upon the return of either the manual collect or refund key by the operator, relay 310 or 340 will restore, circuits for which have been traced hereinbefore, and also, slow-to-release relay 350 will restore after a delay, circuit for which also has been traced hereinbefore. If the coin or coins have not been properly disposed of, coin springs 3 will not reset to a normally opened position. Thus, for the short time relay 350 remains operated after relay 310 or 340 restore, a circuit will be complete to operate relay 460, traced over the following path: ground at paystation A, through coin magnets 2, coin springs 3, out over line —L and the repeater, selector wiper —L, selector bank contact —L, contacts 301, 311, 341, 352, conductor 381, conductor 481, plug sleeve 478, through relay 460 to battery. Relay 460, in closing contact 462 locks itself operated over the following path: ground, contacts 472, 474, 462, through relay 460 to battery. Relay 460 also, in closing contacts 461 illuminates lamp L6. Thus, it will be seen that failure of coin refunding or collecting—i. e. maintaining ground on line —L will cause a signal lamp to so indicate. The operator could then repeat the manual operation until the coins are dislodged.

It will now be assumed that a party at a substation B on a regular line wishes to communicate with the operator. Upon dialing in the usual manner the regular line will be extended to the CLR trunk and relays 440, 430 and 420 will operate exactly as hereinbefore explained. However as a regular line will access this CLR trunk from a three wiper selector (i. e. no EC), no ground will be available to operate relay 450. This can be seen in Fig. 3. Thus, relay 320 will not operate. The result is that the call signal lamp will illuminate continuously, indicating to the operator that a regular line substation is calling. The circuit for the call signal lamp will now be traced over the following path: ground, contacts 453, 434, 405, through call signal lamp L5 to battery. The operator plugs in and causes the operation of relays 410, 400, and 360 in exactly the same manner as hereinbefore explained. However, relay 310 will not operate and automatically causes refund potential to be applied to line —L, as was the case in paystation service. Relay 310 is prevented from operating at open contact 321. As relay 400 operates and before relay 420 restores, the cord disconnect lamp will illuminate, as hereinbefore explained. However, this time the lamp will receive steady ground to illuminate continuously traced over the following path: ground, contacts 453, 434, 405, 424, 433, jack sleeve S, plug sleeve S, through cord disconnect lamp L7 to battery. The operator then handles the call in the usual manner. The operator knows that no coin service is required on this call from a regular substation line but if she inadvertently attempts to give such service, relay 450, not being operated will open the manual collect and refund circuits, as hereinbefore traced, at contacts 455 and 456, respectively.

Having described my invention in detail, what I claim and desire to be protected by an issuance of Letters Patent of the United States is:

1. In an automatic telephone system, a paystation including a calling device, a coin disposal means and a coin hopper, a coin trigger associated with said hopper and said coin disposal means, said coin trigger operated only by deposited acceptable denominations of coins and unoperated by deposited non-acceptable denominations of coins, a finder-repeater-selector link accessible to said paystation, a hookswitch at said paystation, means operated by said hookswitch when said paystation is calling for initiating the operation of said finder and associated link to find and seize said paystation, means for transmitting dial tone to said repeater from said selector, a repeating coil in said repeater, shunting means in said repeater, said shunting means normally shunting said repeating coil and maintaining said shunt in case a coin of non-acceptable denomination has been deposited in said hopper of said calling paystation and said coin trigger is unoperated, whereby the transmission of said dial tone from said repeater to said calling paystation is prevented, a line relay in said repeater, means for operating said line relay when said calling device is operated at said calling paystation, means for operating said coin disposal means, and means operated by said line relay for operating said last-mentioned means to refund said deposited non-acceptable coins immediately subsequent to the dialling of the first digit of a desired call number.

2. In an automatic telephone system, a paystation having a calling device and a coin hopper, a coin trigger associated with said hopper, said coin trigger operated only by deposited acceptable denominations of coins and unoperated by deposited non-acceptable denominations of coins, a finder-repeater-selector link accessible to said paystation, a hookswitch at said paystation, means operated by said hookswitch when said paystation is calling for initiating the operation of said finder to find and seize said paystation, a line relay in said repeater, means for operating said line relay when said paystation is seized, means operated by said operation of said line relay for seizing said selector, means associated with said calling device for pulsing said line relay when said calling device is operated at said calling paystation, pulsing contacts operated by said line relay for transmitting switch controlling pulses from said repeater to said seized selector, means for normally supplying dial tone to said repeater from said selector, a repeating coil in said repeater, shunting means in said repeater, said shunting means shunting said repeating coil and said pulsing contacts and maintaining said shunts only in case a coin of non-acceptable denomination has been deposited in said hopper at said calling paystation and said coin trigger is unoperated, whereby the transmission of said dial tone from said repeater to said calling paystation and the transmission of said switch controlling pulses from said repeater to said seized selector are respectively prevented.

3. An automatic telephone system such as claimed in claim 2, wherein said coin hopper comprises two coin channels, one of said channels being for said deposited non-acceptable coins and the other of said channels being for deposited acceptable coins, and said coin trigger being so disposed as to project only into said other coin channel.

4. An automatic telephone system such as claimed in claim 2, including a source of ground potential associated with said coin trigger, a differential relay in said repeater, an operating circuit for said differential relay, means operated by said coin trigger in case a coin of an acceptable denomination has been deposited in said hopper at said calling paystation to apply said ground potential to said differential relay operating circuit for operating said differential relay, and means operated by said operation of said differential relay for operating said shunting means to remove said shunts from said repeating coil and said pulsing contacts, whereby dial tone is effectively transmitted from said repeater to said calling paystation and said switch controlling pulses are effectively transmitted from said repeater to said seized selector respectively.

5. An automatic telephone system such as claimed in claim 4, including coin disposal means, means for operating said coin disposal means, and means operated by said line relay for operating said last-mentioned means to operate said coin disposal means to refund said deposited non-acceptable coin immediately subsequent to the dialling of the first digit of a desired call number.

6. An automatic telephone system such as claimed in claim 5, including means operated upon completion of a call, and subsequent to said hookswitch being restored to normal, for operating said coin disposal operating means, said coin disposal means thereby operated to collect said deposited acceptable coin.

CLARENCE E. LOMAX.

References Cited in the file of this patent

UNITED STATES PATENTS

| Number | Name | Date |
|---|---|---|
| 1,200,788 | Williams | Oct. 10, 1916 |
| 1,722,351 | Quass | July 30, 1929 |
| 1,859,885 | Paine | May 24, 1932 |
| 1,924,095 | Griffins | Aug. 29, 1933 |
| 2,248,575 | Lomax | July 8, 1941 |
| 2,271,681 | Davidson | Feb. 3, 1942 |
| 2,372,262 | Edwards | Mar. 27, 1945 |
| 2,471,087 | Anderson | May 24, 1949 |
| 2,509,477 | Carson et al. | May 30, 1950 |